Patented Oct. 13, 1931

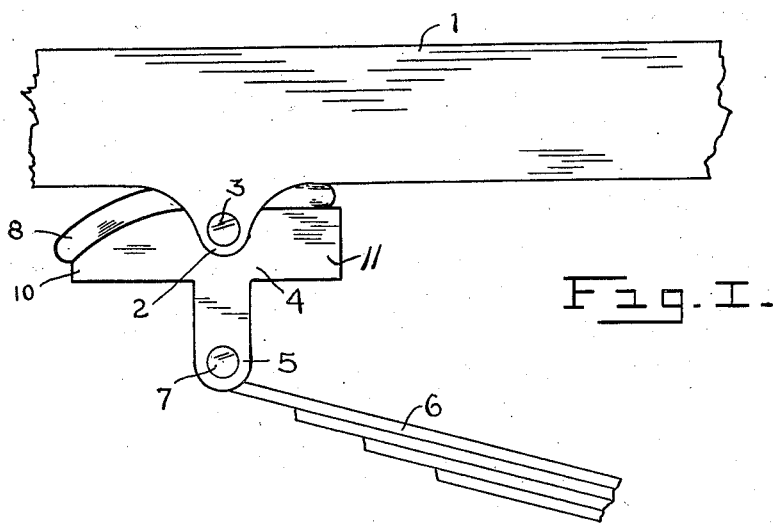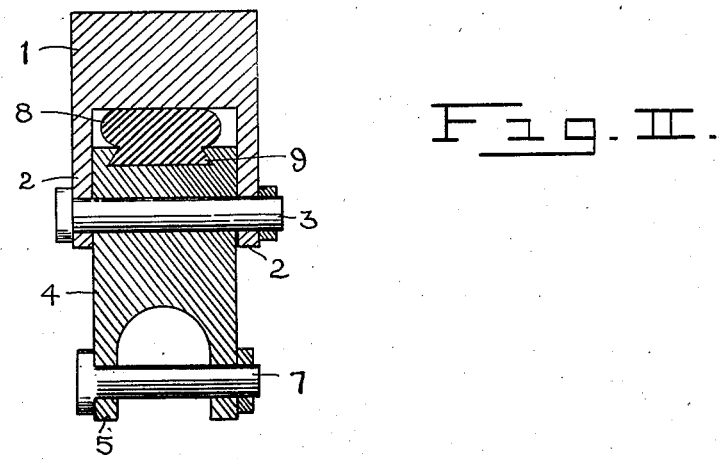

1,827,284

UNITED STATES PATENT OFFICE

NORMAN L. DOOTSON, OF SAN FRANCISCO, CALIFORNIA, ASSIGNOR OF ONE-FIFTH TO CHAS. W. BASSETT AND W. B. JUETT, BOTH OF ANTIOCH, CALIFORNIA

RUBBER CUSHIONED SPRING SHACKLE

Application filed May 26, 1930. Serial No. 455,604.

My invention relates to improvements in spring shackles and the object of my improvement is to provide a spring shackle with a rocker mechanism allowing movement in one direction, but checking it in the other.

Another object is to provide a rubber cushion between the rocker and the car frame to dampen the movement of the spring.

In the drawings, Figure 1 is a side elevation of the spring shackle linking the spring to the car frame, and Figure 2 is a front vertical section.

The car frame 1 has lugs 2 perforated to receive the bolt 3. The rocker 4 having three projecting arms, rocks upon the bolt 3. The leaf spring 6 is attached by bolt 7 to the perforated arm 5. A rubber cushion 8 with a base 9 dovetailed in the rocker 4 lies between the car frame 1 and the curved top of the rocker 4.

As the spring straightens after a jolt, the arm 5 of the rocker is pushed back, and the rocker arm 10 rises. The rubber cushion 8 dampens the movement of the spring as it straightens; and the projection 11 prevents recoil, with the resultant absorption of shocks.

I claim:

1. A spring shackle of T-shape having an upright portion with a shackle bolt hole at the base, a crosspiece, one end of which is at right angles to the upright, and the other having an upper surface dropping away in a curve to form a rocker, a second shackle bolt hole in the center of the crosspiece; and a rubber cushion attached to the top of the crosspiece.

2. The combination of a car frame having perforated lugs, a shackle with a convex upper surface bolted to said lugs, a resilient cushion between the shackle and the car frame, and one end of a leaf spring bolted to the lower part of said shackle.

3. In a vehicle, a spring shackle having a partially straight and a partially curved upper surface, and a resilient cushion attached to said upper surface in such a manner as to allow said resilient cushion to partially contact with the vehicle frame during the normal movement or non-movement of said spring shackle.

4. The combination of a car frame, a shackle with a convex upper surface bolted to said car frame, a resilient cushion between the shackle and the car frame, and one end of a leaf spring bolted to the lower part of said shackle.

5. A spring shackle having a convex crosspiece, a resilient cushion attached to the upper surface of said crosspiece, and means for connecting the top of said shackle to a car frame and the base of said shackle to one end of a leaf spring.

6. A spring shackle having a crosspiece with a convex upper surface, a resilient cushion attached to said upper surface, and means for connecting the top of said shackle to a vehicle frame and the base of said shackle to one end of a leaf spring.

7. A spring shackle having a convex upper surface, a resilient cushion attached to said upper surface, and means for pivotally connecting the top of said shackle to a vehicle frame and the base of said shackle to one end of a vehicle suspension spring.

8. A mechanism for dampening longitudinal movement of a vehicle suspension spring, said dampening force increasing in proportion as the severity of the spring jolts are increased, comprising the combination of a vehicle frame, a spring shackle with a convex upper surface pivotally connected to said frame, a resilient cushion attached to said upper surface, and one end of a leaf spring pivotally connected to the base of said shackle.

In testimony whereof I hereby affix my signature.

NORMAN L. DOOTSON.